US007705971B2

(12) United States Patent
Crowe

(10) Patent No.: US 7,705,971 B2
(45) Date of Patent: Apr. 27, 2010

(54) SYSTEM AND METHOD FOR DETERMINING CROSSWINDS

(75) Inventor: Devon G. Crowe, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 8 days.

(21) Appl. No.: 11/756,646

(22) Filed: Jun. 1, 2007

(65) Prior Publication Data
US 2008/0297762 A1 Dec. 4, 2008

(51) Int. Cl.
*G01P 3/36* (2006.01)
(52) U.S. Cl. .......................... 356/28; 356/28.5
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 3,825,346 | A * | 7/1974 | Rizzo | 356/28.5 |
| 4,919,536 | A * | 4/1990 | Komine | 356/28.5 |
| 5,123,730 | A * | 6/1992 | Holmes et al. | 356/28.5 |
| 5,216,477 | A * | 6/1993 | Korb | 356/28.5 |
| 5,610,705 | A * | 3/1997 | Brosnan et al. | 356/28.5 |
| 6,247,259 | B1 * | 6/2001 | Tsadka et al. | 42/114 |
| 2003/0053071 | A1* | 3/2003 | James et al. | 356/491 |
| 2007/0077071 | A1* | 4/2007 | Belenkiy | 398/130 |

OTHER PUBLICATIONS

Gill, David Dennis, "Precision Replication of Co-Molded Meso and Micro Optics Through Injection Molding", Ph.D. Dissertation, North Carolina State University, (2002).

Palmer, Christopher, "Diffraction Grating Handbook", 5th ed., Richardson Grating Laboratory, Rochester, New York.

"The Optical Replication Process", Spectrum Scientific, Inc., (Jun. 2005), [retrieved on Feb. 21, 2008], <http://www.ssioptics.com/replicationprocess.html>.

"Custom VPH Gratings", Kaiser Optical Systems, Inc., A Rockwell Collins Company, [retrieved on Jun. 4, 2007], <http://www.kosi.com/gratings/custom/index.html>.

Tremblay, Eric J. et al., "Ultrathin cameras using annular folded optics", Applied Optics, (2007), vol. 46, Issue 4, pp. 463-471.

(Continued)

*Primary Examiner*—Thomas H Tarcza
*Assistant Examiner*—Luke D Ratcliffe
(74) *Attorney, Agent, or Firm*—Renner, Otto, Boisselle & Sklar, LLP

(57) ABSTRACT

A system and method for measuring crosswinds includes using a laser to send a signal on a signal path, and receiving response signals backscattered off of aerosols or other materials in the atmosphere along the signal path. Wavefronts of the received responses are perturbated by thermal cell turbulence in the atmosphere that perturbs optical wavefront propagation. Signals backscattered by airborne aerosols at different distances from the laser in the wavefront imager arrive at different times at the wavefront imager. Thus the wavefront perturbations vary with range, and data on the perturbed wavefront may be collected by the wavefront imager. Crosswinds cause movements in the optical perturbations over time, as the thermal cell turbulence moves. By comparing wavefronts of signals sent at different times an amount of thermal cell displacement may be determined at a series of ranges away from the laser and the wavefront imager.

23 Claims, 2 Drawing Sheets

OTHER PUBLICATIONS

"Optical Coherence Tomography", Wikipedia, [retrieved on Mar. 21, 2007], <http://en.wikipedia.org/wiki/Optical_coherence_tomography>.

Chen, Tian-Jie et al., "Graded-reflectivity mirror based on a volume phase hologram in a photopolymer film", Applied Optics, (1998), vol. 37, No. 28, pp. 6603-6608.

Juberts, Maris et al., "Status report on next generation LADAR for driving unmanned ground vehicles" Proceedings of SPIE, (2004), vol. 5609, pp. 1-12.

Banakh, V.A. et al., "Wind velocity profile reconstruction from intensity fluctuations of a plane wave propagating in a turbulent atmosphere", Optics Letters, (2007), vol. 32, No. 15.

Arns, James A. et al., "Volume phase gratings for spectroscopy, ultrafast laser compressors, and wavelength division multiplexing", Current Developments in Optical Design and Optical Engineering VIII, (1999), vol. 3779, pp. 313-323.

Baharav, Yael et al., "Wave-front sensing by pseudo-phase-conjugate interferometry", Applied Optics, (1995), vol. 34, No. 1, pp. 108-113.

Djordjevic, Ivan et al., "LDPC coded OFDM over the atmospheric turbulence channel", Optics Express, (2007), vol. 15, No. 10, pp. 6336-6350.

Barden, Samuel C. et al., "Volume-phase holographic gratings and their potential for astronomical applications", Proceedings of SPIE, (1998), vol. 3355, pp. 866-876.

"Origami Lens Slims High Resolution Cameras", Jacobs School of Engineering: News & Events, [retrieved on May 11, 2007], <http://www.jacobsschool.ucsd.edu/news/news_releases/release.sfe?id=617>.

* cited by examiner

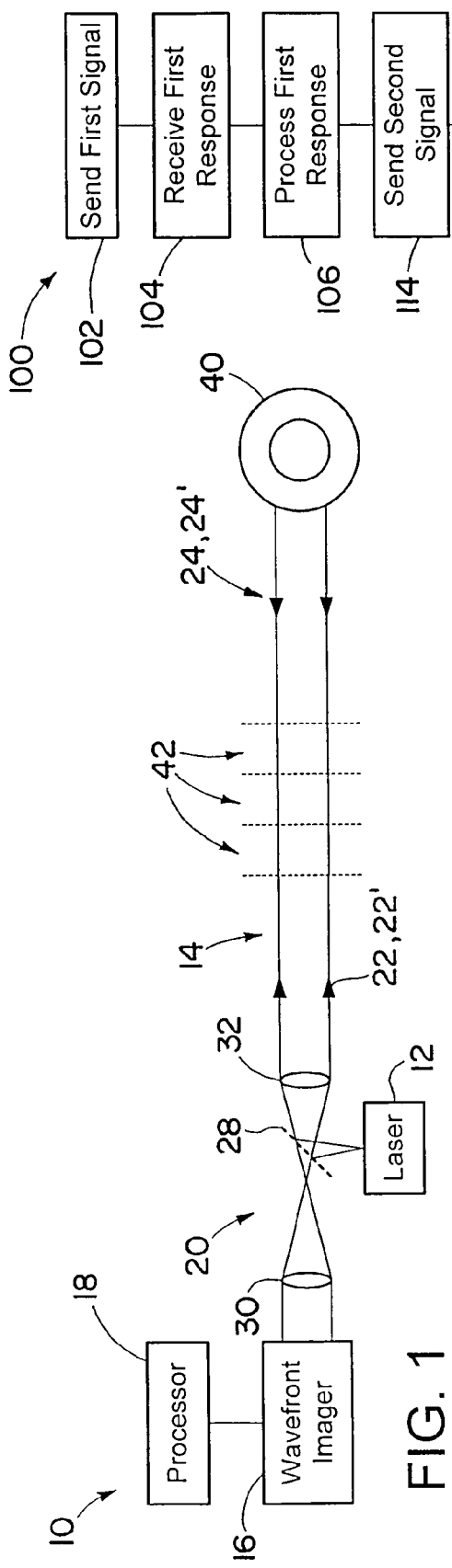

SYSTEM AND METHOD FOR DETERMINING CROSSWINDS

BACKGROUND OF THE INVENTION

1. Technical Field of the Invention

The invention is in the general field of wind speed determination devices and methods.

2. Description of the Related Art

It is known to measure wind along a line of sight by use of the Doppler effect on radar, ladar, or acoustic signals. Wind speed in the direction along the line of sight changes the frequency of a return signal from that of an emitted signal. The magnitude of the frequency change may be used to determine the wind speed in the direction in which the signal was sent (and in which the return signal was received).

Attempts have been made to measure wind in multiple directions by sending signals in multiple directions, and using the Doppler effect to determine wind speed in each of the directions. Using the wind speed in these multiple directions a calculation can be made to approximate the wind velocity in three-dimensional space around a measuring device. However measuring devices that utilize this principle require collecting data in many directions in a very short period of time and large amounts of computing power to approximate the three-dimensional wind velocity field. Further, the results are only approximate.

From the foregoing it will be appreciated that improvements are possible in the field of wind velocity measurement.

SUMMARY OF THE INVENTION

According to an aspect of the invention a method of measuring crosswinds includes correlating movements of thermal cell turbulence that perturbs optical wavefront propagation. The method may include measuring crosswinds at multiple range locations along a line.

According to another aspect of the invention a system for measuring crosswinds includes a wavefront imager (or wavefront sensor) that detects variations in optical wavefronts due to perturbations in an optical path along a line of sight.

According to yet another aspect of the invention, a method for determining crosswinds includes the steps of: sending a first laser signal along a signal path at a first time; receiving at a wavefront imager a first response from the first laser signal, wherein the first response has a first wavefront; sending a second laser signal along the signal path at a second time; receiving at the wavefront imager a second response from the second laser signal, wherein the second response has a second wavefront; and determining a crosswind by comparing the first wavefront and the second wavefront.

According to still another aspect of the invention, a method for determining crosswinds includes the steps of: sending a first laser signal along a signal path at a first time; receiving at a wavefront imager a first response, backscattered from the first laser signal at multiple locations along the signal path; sorting the first response into a series of range gate bins, based on time of arrival at the wavefront imager; characterizing, for multiple of the range gate bins, first wavefront features of a first wavefront of the first response; sending a second laser signal along the signal path at a second time that is after the first time; receiving at the wavefront imager a second response, backscattered from the second laser signal at multiple locations along the signal path; sorting the second response into the range gate bins, based on time of arrival at the wavefront imager; characterizing, for the multiple of the range gate bins, second wavefront features of a second wavefront of the second response; and determining a crosswind by correlating the first wavefront features and the second wavefront features for at least one of the range gate bins.

According to a further aspect of the invention, a crosswind determination system includes: a laser; a wavefront imager; optics; and a processor operatively coupled to the wavefront imager. The optics are operatively coupled to the laser to direct outgoing signals from the laser to a signal path away from the system. The optics are operatively coupled to the wavefront imager to direct backscattered responses from the outgoing signals, received by the system from the signal path, to the wavefront imager. The processor includes: means to sort wavefronts of the responses individual outgoing signals into range gate bins based on time of receipt at the wavefront imager; and means to correlate wavefront features of the wavefronts, to thereby determine magnitude and direction of crosswinds perpendicular to the signal path.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 1 is a schematic diagram of a crosswind determination system in accordance with an embodiment of the invention;

FIG. 2 is a schematic diagram of one embodiment of a wavefront imager usable with the system of FIG. 1;

FIG. 3 is a schematic diagram of a second embodiment wavefront imager usable with the crosswind determination system of FIG. 1;

FIG. 4 is a high-level flow chart of a method of utilizing the system of FIG. 1;

DETAILED DESCRIPTION

Figure 7:
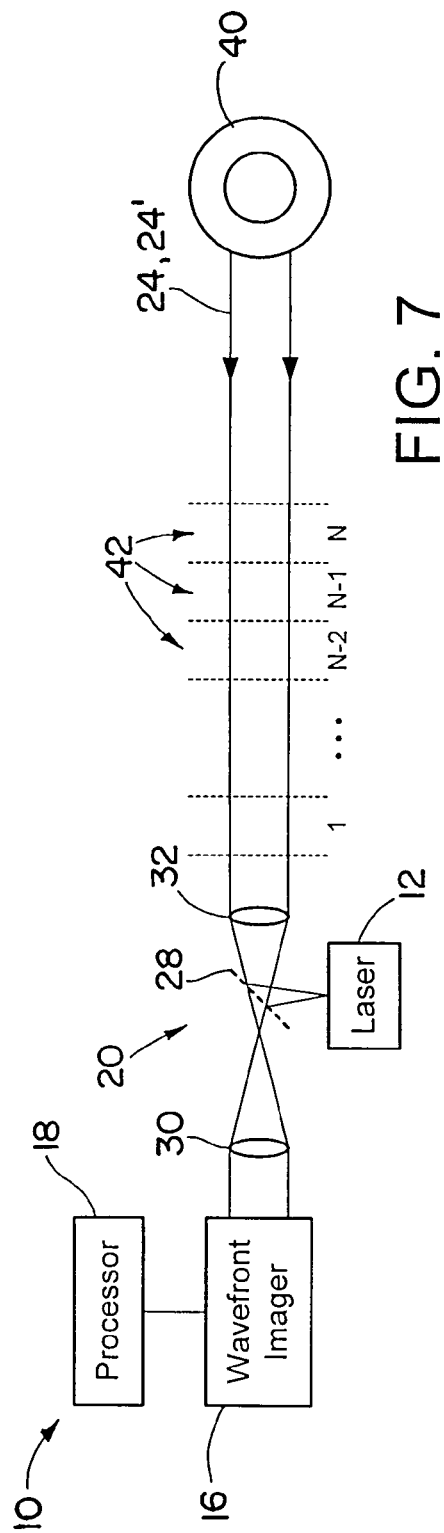
FIG. 7 is a diagram illustrating range gate bin bins utilized in the method of FIG. 4.

A system and method for measuring crosswinds includes using a laser to send a signal on a signal path, and receiving response signals backscattered off of aerosols or other materials in the atmosphere along the signal path. Wavefronts of the received responses are perturbated by thermal cell turbulence in the atmosphere. The thermal cell turbulence perturbs optical wavefront propagation of the outgoing signals and the returning response signals. The response signals are received by a wavefront imager, which records or measures the perturbations in the optical wavefront. Signals backscattered by airborne aerosols at different distances from the laser in the wavefront imager arrive at different times at the wavefront imager. Thus the wavefront perturbations vary with range, and data on the perturbed wavefront may be collected by the wavefront imager. A second signal may be sent back by the laser, with a second response received by the imager. Crosswinds (winds and wind components perpendicular to the signal path) cause movements in the optical perturbations over time, as the thermal cell turbulence moves. By comparing wavefronts of signals sent at different times an amount of thermal cell displacement may be determined at a series of ranges away from the laser and the wavefront imager. At any given range, this perturbation is the sum of all perturbations along the signal path at ranges less than the given range. The movement of these perturbations directly correlates with the amount and direction of crosswind. Using the data from the two responses, crosswind direction and magnitude may be determined at a series of ranges along a signal path.

FIG. 1 shows a crosswind determination system 10 that includes a laser 12 for sending out signals along a signal path 14, a wavefront imager 16 for receiving response signals (signals caused by backscattering of signals from the laser 12, such as by aerosols in the air along the signal path 14), and a processor 18 for processing response signals received by the wavefront imager 16. The system 10 also includes optics 20 for properly directing and focusing outgoing signals 22 from the laser 12. The optics 20 may also direct and focus response signals 24, the backscatterings of the outgoing signals 22 off of aerosols or other materials in the atmosphere along the signal path 14. The optics 20 includes a beam splitter 28, and a pair of lenses 30 and 32. The beam splitter 28 is used to direct outgoing light from the laser 12 along the signal path 14. The beam splitter 28 also directs returning light (the backscattered response signals 24) to the wavefront imager 16. The lenses 30 and 32 are used for focusing the outgoing and returning light beams. It will be appreciated that a wide variety of devices and configurations may be used for the optics 20.

The processor 18 is used to store and process information from the wavefront imager 16. As is described in greater detail below, the processor 18 is used to determine information regarding the wavefronts detected by the wavefront imager 16, and to determine correlations and changes between different responses at different times and at different ranges.

The processor 18 may be embodied in hardware, such as in an integrated circuit, and/or in software. The processor 18 may be integrated with the rest of the system 10, for example in a single housing. Alternatively, the processor 18 may be embodied in a separate standard computer running software to perform the functions described herein.

In operation, a signal 22 is emitted from the laser 12. The signal 22 is a pulse of laser light, for example having a duration short enough to effectively freeze the atmospheric turbulence perhaps under 10 milliseconds) and short enough to allow analysis of the desired range bin. The wavelength may be chosen for eye safe operation, and may be chosen to have good atmospheric backscatter characteristics. A wavelength of 0.35 μm has been found to be suitable for the system and method described herein. Such a wavelength may provide eye safe operation at low power levels. Further eye safety may be provided by a smaller wavelength, such as 0.15 μm, may provide and even greater margin of safety. However, 0.35 μm provides a backscatter signal from air that is about 100 times stronger than 0.15 μm light. In addition the coherence length of 0.35 μm radiation is smaller by 0.15 μm radiation by a factor of six, which allows more compact optics. It will be appreciated that other suitable wavelengths may be used.

The light from the laser 12 is backscattered off of the beam splitter 28 and then passes through the lens 32. The signal 22 then follows a straight signal path 14. As the signal 22 travels along the signal path 14 it collides with and is backscattered off of aerosols or other materials in the air. This causes creation of the response signals 24 traveling back toward the optics 20. The response signals 24 are created all along the signal path 14, either until the light signal 22 becomes weak enough such that backscattered signals 24 are not strong enough to make it back to the optics 20, or until the outgoing signal 22 reaches a target object 40. The responses 24 travel back along the signal path 14, and pass through the optics 20 to the wavefront imager 16. It will be appreciated that the responses 24 from different locations reach the wavefront imager 16 at different times. The responses 24 from farther along the signal path 14 reach the wavefront imager 16 later than the responses 24 that are closer to the optics 20 and the laser 12. This is because a longer path is traveled by the outgoing signal 22 and the response signal 24 when the response is located farther from the system 10. Thus the different responses 24 received at the wavefront imager 16 can be divided up into a series of range gate bins 42, by division based on the time the responses 24 are received at the wavefront imager 16. Each of the range gate bins 42 corresponds to an interval of time over which some of the responses 24 are received at the wavefront imager 16. The range gate bins 42 may represent any of a variety of suitable distances along the signal path 14. As one example, the range gate bins 42 may each represent about 100 meters in distance along the signal path 14. However, it will be appreciated that the range gate bins may represent any of a variety of suitable distances. The range gate bins 42 may each represent substantially the same distance. Alternatively, some of the range gate bins 42 may have different sizes than other of the range gate bins 42. The range gate bins 42 may cover substantially all of the length of the signal path 14 for which the responses 24 are generated.

In brief, the laser 12 sends forth a series of signals 22, 22' at different times. The wavefront imager 16 receives the responses 24, 24' from each of the outgoing signals 22, 22'. The responses 24, 24' are divided up into the various range gate bins 42 to determine a wavefront profile or other indication of the wavefront characteristics. The wavefront profile of the responses 24 varies to some extent because of atmosphere turbulence within the air or other atmosphere of the signal path 14. Thermal cell turbulence in the atmosphere perturbs the optical wavefront propagation. This turbulence moves along with the atmosphere, at least on a small time scale. Since these perturbations of optical conditions vary throughout the air that is in the signal path 14, it will be expected that the wavefront shape for the various range gate bins 42 are different from one another. The presence and locations of the thermal cell turbulence that perturbs the optical wavefront propagation may be substantially random throughout the air in the signal path 14. The processor 18 may be used to characterize the pattern of the wavefront disturbances from the various range gate bins 42. The processor 18 may also be used to compare the wavefronts from the responses 24 to different signals from the laser 12 at different times, produced by the same range gate bin 42. By correlating the wavefront pattern at different times from the same range gate bin 42 a measure of the crosswind direction and magnitude may be determined.

FIG. 2 shows one embodiment of the wavefront imager 16. In this embodiment the wavefront imager includes a lenslet array 50 with a plurality of lenslets 52. A wavefront 54 reaches the lenslet array 50. The individual lenslets 52 focus the light rays of different parts of wavefront 54 in different directions, onto a focal plane array 56. The pattern of intensity is on the focal plane array 56 is an indicator of the shape of the wavefront 54. Although shown in only one dimension, it will be appreciated that the wavefront imager 16 has the lenslet array 50 and the focal plane array 56 in two dimensions. The wavefront imager 16 is a Shack-Hartmann wavefront sensor. An example of a suitable Shack-Hartmann wavefront sensor is the EDSI HASO3 sensor, available from Imagine Optic of Tucson, Ariz., USA.

FIG. 3 shows another embodiment of the wavefront imager 16. The imager 16 shown in FIG. 3 includes a beam splitter 60 which splits the return responses toward a mirror 62 in one leg, and a lenslet array 64 and a mirror 66 in a different leg. Signals backscattered off the mirrors 62 and 66 return to the beam splitter 60. Portions of the backscattered signals are sent through a lens 68 and to a focal plane array or other detector 70. The result from this arrangement is an interferometric image. Further information regarding such a pseudo-phase-conjugate interferometry system may be found in Yael Baharev et al., Wave-Front Sensing by Pseudo-Phase-Conjugate Interferometry, Applied Optics, Vol. 34, No. 1, pp. 108-113, 1995.

FIG. 4 shows some steps of a method 100 for using the system 10 (FIG. 1) for determining crosswinds. Though the steps of the method 100 are arrayed in a high-level flowchart, it will be appreciated that there may be considerable variation in the order of the steps from what is shown in FIG. 4. The steps may be performed in a different sequence from that shown, and multiple steps may be performed at least in part simultaneously.

Figure 5:
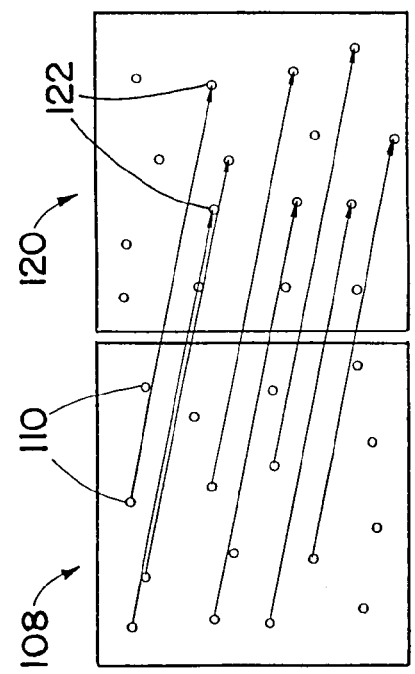
FIG. 5 is a diagram illustrating a pair of frames showing wavefront characterizations, such as may be produced using the method of FIG. 4.

With reference to FIG. 1, in step 102 the laser 12 sends a signal 22 along the signal path 14. In step 104 the responses 24 are received at the wavefront imager 16. The responses 24, which are sometimes referred to herein as a single first response, are received over a time period at the imager 16. In step 106 the responses are a processed in the processor 18. In doing so the responses are divided up over the individual range gate bins 42 based on the time of receipt at the wavefront imager 16. The wavefronts received are also characterized. In characterizing the wavefront of the first response peaks and troughs may be identified. Frame 108 of FIG. 5 shows an example of characterization of a wavefront. The points 110 in frame 108 represent identified characterized points of a wavefront from responses to the first signal 22.

In step 114 a second signal 22' is sent along the same signal path 14. Second responses 24' from the second outgoing signal 22' are received at the wavefront imager 16 in step 116. In step 118 the second responses 24' are processed in the processor 18 to divide the responses into range gate bin based on time of receipt, and to characterize the wavefronts in the responses 24 and 24'. In steps 116 and 118 may be similar to the steps 104 and 106 described above with regard to the responses 24 to the first signal 22. The right side of FIG. 5 shows a frame 120 illustrating a characterized wavefront from the second response 24'. The dots 122 indicate characteristic points of the wavefront, such as crests or troughs. The frames 108 and 120 represent wavefront characterizations from the same range gate bin 42.

Figure 6:
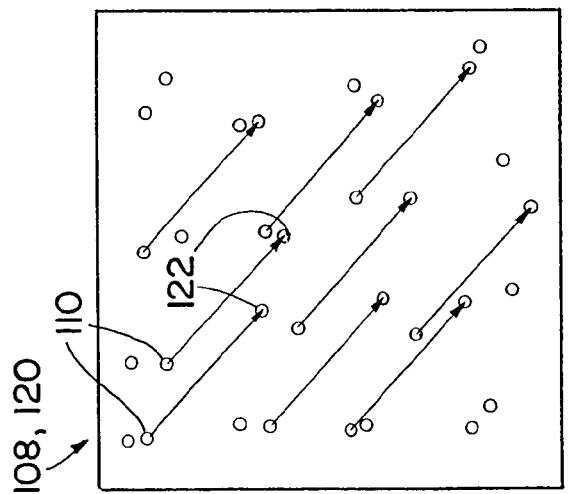
FIG. 6 is a diagram superpositioning the two frames shown in FIG. 5.

In step 126 a correlation is performed between the first response, processed in step 106, and the second response, processed in step 118. With reference again to FIG. 5, the correlation in step 126 seeks to find a translation that accounts for the movement of the points 110 in frame 108 to the points 122 in frame 120. The resulting shift or translation 128 is better illustrated by the superposition of frames 108 and 120 shown in FIG. 6. The correlation may be found by mathematical method to search for the shift or translation 128 (magnitude and direction) that best duplicates the pattern of the points 120 and 122 occurring in both of the frames 108 and 120. What is sought in the correlation process is image offset $(x_0, y_0)$ at which a correlation $\rho$ is maximized. The correlation $\rho$ is defined as $$\rho = \frac{\sum_{x=1}^{m}\sum_{y=1}^{n} A(x_i, y_i) B(x_i - x_0, y_i - y_0)}{\sum_{x=1}^{m} A(x_i, y_i) \sum_{y=1}^{n} B(x_i, y_i)} \quad (1)$$

where A and B are brightnesses at locations in the first frame and the second frame, respectively. The correlation in step 126 produces a shift 128 for each of the range gate bins 42.

The correlations from step 126 produce indications of the wind speed and direction for each of the range gate bins. However, rather than being an indication of the local crosswind at any single range gate bin 42, the shifts 128 provide an indication of the integral of the total wind at all of the range gate bins along the signal path 14, up to the range gate bin 42 for which the shift 128 has been calculated. In step 130 these shifts may be used to get the local crosswind at the individual range gate bins 42. For each of the range gate bins 42 of interest, the shift 128 at that range gate bin is modified by subtracting the shift at the upstream range gate bin (closer to the system 10). With reference to FIG. 7, to determine the crosswind magnitude and direction at a range gate bin N, the shift at that range gate bin N is modified by subtracting out the shift for range gate bin N−1. This modification is necessary to get the local crosswind because the shift 128 for the range gate bin N involves the effect of the shifts of all of the other range gate bins 42 between the system 10 and the range gate bin N.

The system 10 may operate by sending signals and getting responses at a high frequency. For situations where there is a high wind speed frequencies closely spaced in time may be correlated with one another to obtain the wind speed. For slower wind speeds slower framing rates may be utilized. One way to handle slow winds is to slow down the frame rate of signals sent and responses received. An alternative way is to maintain the high frame rate but to correlate other than successive frames. For example, every tenth frame may be correlated to achieve better accuracy in determination of low velocity crosswinds. The interval between pulses is selected such that the interval allows resolution of movement of the wavefront, but such that the movement is small enough to maintain a useful correlation. Selecting a pulse rate to sample wavefront motion between 10% and 50% of a frame width at the wind speed and field of view of the system may be appropriate.

Utilizing the method 100, the system 10 may be used to get the magnitude and direction of local crosswind at all of the various range gate bins 42. The method 100, using the system 10, may be used in any of wide variety of circumstances to determine crosswinds. It will be recognized that the component of wind in the direction of the signal path 14 can be easily obtained using known methods based on Doppler shifting. Thus the method 100 may be used to obtain wind velocity in three dimensions along the signal path 14. Examples of applications for the method 100 and the system 10 are in weather observation and prediction, in operation of airports, and in targeting objects in environments where wind may be present.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining crosswinds, the method comprising:
sending a first laser signal along a signal path at a first time;
receiving at a wavefront imager a first response from the first laser signal, wherein the first response has a first wavefront;
sending a second laser signal along the signal path at a second time;
receiving at the wavefront imager a second response from the second laser signal, wherein the second response has a second wavefront; and
determining a crosswind by comparing the first wavefront and the second wavefront;
wherein the responses are backscatterings of the signals from aerosols in air in which the crosswind is determined.

2. The method of claim 1, wherein the determining includes sorting both of the wavefronts into range gate bins.

3. The method of claim 2, wherein the sorting includes sorting the wavefronts by time received at the wavefront imager.

4. The method of claim 2, wherein the determining includes determining crosswind for multiple of the range gate bins.

5. The method of claim 2, wherein the range gate bins each correspond to at least 100 meters of distance along the signal path.

6. The method of claim 2, wherein the determining includes correlating wavefront features of the first wavefront and the second wavefront, to determine translation of the wavefront features.

7. The method of claim 6, wherein the correlating to determine translation includes determining both magnitude and direction of the translation.

8. The method of claim 6, wherein the correlating also includes taking the difference between different wavefront translations of different range bins.

9. The method of claim 1,
wherein the sending of the laser signals includes sending the laser signals through a beam splitter; and
wherein the receiving of the responses includes passing the responses through the beam splitter, and to the wavefront imager.

10. The method of claim 1, wherein the determining includes determining both crosswind direction and crosswind velocity.

11. The method of claim 1, wherein the determining includes mathematically correlating a first wavefront pattern of the first wavefront, with a second wavefront pattern of the second wavefront.

12. The method of claim 11, wherein the wavefront patterns include scintillation patterns produced by variations in optical properties along an optical part of the signal.

13. The method of claim 11, wherein the correlating includes correlating perturbations in optical wavefront propagation caused by thermal cell turbulence.

14. The method of claim 1, wherein the laser signal have substantially the same frequency.

15. The method of claim 1, wherein the determining the crosswind includes determining the crosswind in a direction perpendicular to the signal path.

16. The method of claim 1,
wherein the responses are backscatterings of the signals; and
wherein the responses travel along at least part of the signal path.

17. The method of claim 1, wherein the responses travel on at least part of the signal path, in a direction opposite from the laser signals.

18. A method for determining crosswinds, the method comprising:
sending a first laser signal along a signal path at a first time;
receiving at a wavefront imager a first response, backscattered from the first laser signal at multiple locations along the signal path;
sorting the first response into a series of range gate bins, based on time of arrival at the wavefront imager;
characterizing, for multiple of the range gate bins, first wavefront features of first wavefront of the first response;
sending a second laser signal along the signal path at a second time that is a after the first time;
receiving at the wavefront imager a second response, backscattered from the second laser signal at multiple locations along the signal path;
sorting the second response into the range gate bins, based on time of arrival at the wavefront imager;
characterizing, for the multiple of the range gate bins, second wavefront features of a second wavefront of the second response; and
determining a crosswind by correlating the first wavefront features and the second wavefront features for at least one of the range gate bins.

19. The method of claim 18, wherein the responses are backscatterings of the signals from aerosols in air in which the crosswind is determined.

20. The method of claim 18, wherein the range gate bins each correspond to at least 100 meters of distance along the signal path.

21. A crosswind determination system comprising:
a laser
a wavefront imager;
optics; and
a processor operatively coupled to the wavefront imager;
wherein the optics are operatively coupled to the laser to direct outgoing signals from the laser to a signal path away from the system;
wherein the optics are operatively coupled to the wavefront imager to direct backscattered responses from the outgoing signals, received by the system from the signal path, to the wavefront imager; and wherein the processor includes:
- means to sort wavefronts of the responses of individual outgoing signals into range gate bins based on time of receipt at the wavefront imager; and
- means to correlate wavefront features of the wavefronts, to thereby determine magnitude and direction of crosswinds perpendicular to the signal path.

22. The system of claim 21, wherein the wavefront imager include
- a lenslet array; and
- a focal plane operatively coupled to the lenslet array.

23. The system of claim 21, wherein the wavefront imager include an interferomatic wavefront imager.

* * * * *